(12) United States Patent
Edlund et al.

(10) Patent No.: US 7,135,048 B1
(45) Date of Patent: Nov. 14, 2006

(54) VOLATILE FEEDSTOCK DELIVERY SYSTEM AND FUEL PROCESSING SYSTEM INCORPORATING THE SAME

(75) Inventors: David J. Edlund, Bend, OR (US); Thomas G. Herron, Bend, OR (US)

(73) Assignee: IdaTech, LLC, Bend, OR (US)

( * ) Notice: Subject to any disclaimer, the term of this patent is extended or adjusted under 35 U.S.C. 154(b) by 1013 days.

(21) Appl. No.: 09/636,814

(22) Filed: Aug. 10, 2000

Related U.S. Application Data

(60) Provisional application No. 60/148,521, filed on Aug. 12, 1999.

(51) Int. Cl.
*C01B 3/24* (2006.01)
*B01J 8/00* (2006.01)

(52) U.S. Cl. .................. 48/127.1; 48/127.9; 422/110; 422/112; 422/187

(58) Field of Classification Search ................ 422/189, 422/198, 200, 202, 204, 208, 105, 108, 110–112, 422/127.9, 187; 429/17, 19, 20, 22, 24–26, 429/34; 48/127.9, 174–178, 190–191, 127.1; 137/255–259, 262, 263
See application file for complete search history.

(56) References Cited

U.S. PATENT DOCUMENTS

| | | | |
|---|---|---|---|
| 2,551,501 A * | 5/1951 | Mitchell et al. ............. 62/50.2 |
| 3,094,391 A | 6/1963 | Mader |
| 3,144,312 A | 8/1964 | Mertens |
| 3,338,681 A | 8/1967 | Kordesch |
| 3,350,176 A | 10/1967 | Green et al. |
| 3,450,500 A | 6/1969 | Setzer et al. |
| 3,469,944 A | 9/1969 | Bocard et al. |
| 3,524,819 A | 8/1970 | Guerrieri |
| 3,668,235 A | 6/1972 | Ichikawa et al. |
| 3,782,904 A | 1/1974 | Fletcher |
| 3,787,038 A | 1/1974 | Tesner et al. |
| 3,920,416 A | 11/1975 | Houseman |
| 3,955,941 A | 5/1976 | Houseman et al. |
| 3,982,910 A | 9/1976 | Houseman et al. |
| 4,003,343 A | 1/1977 | Lee |
| 4,027,495 A * | 6/1977 | Edwards ..................... 62/48.2 |
| 4,098,959 A | 7/1978 | Fanciullo |
| 4,098,960 A | 7/1978 | Gagnon |
| 4,127,393 A | 11/1978 | Timmins et al. |

(Continued)

FOREIGN PATENT DOCUMENTS

EP 1065741 A2 1/2001

(Continued)

OTHER PUBLICATIONS

Amphlett, J.C., et al., "On Board Hydrogen Purification for Steam Reformer/PEM Fuel Cell Vehicle Power Plants," Energy Progress X, Proceedings of the 10th World Hydrogen Energy Conference, Cocoa Beach, Florida, U.S.A., vol. 3, pp. 1681-1690 (Jun. 1994).

(Continued)

*Primary Examiner*—N. Bhat
(74) *Attorney, Agent, or Firm*—Kolisch Hartwell, P.C.

(57) ABSTRACT

A fuel processing assembly adapted to produce hydrogen gas from a volatile feedstock. The fuel processing assembly includes a fuel processor, such as a steam reformer. The fuel processing assembly further includes a feed assembly adapted to deliver a volatile feedstock, such as propane, to the fuel processor. In some embodiments, the fuel processing system includes a fuel cell stack that includes at least one fuel cell adapted to produce electrical power from hydrogen gas produced by the fuel processor.

33 Claims, 4 Drawing Sheets

U.S. PATENT DOCUMENTS

| | | | |
|---|---|---|---|
| 4,195,653 A | 4/1980 | Cessou | |
| 4,238,403 A | 12/1980 | Pinto | |
| 4,302,177 A | 11/1981 | Fankhanel et al. | |
| 4,315,893 A | 2/1982 | McCallister | |
| 4,387,434 A | 6/1983 | Moncrief, Jr. et al. | |
| 4,400,182 A | 8/1983 | Davies et al. | |
| 4,430,304 A | 2/1984 | Spurrier et al. | |
| 4,466,253 A | 8/1984 | Jaster | |
| 4,472,176 A | 9/1984 | Rubin | |
| 4,504,447 A | 3/1985 | Spurrier et al. | |
| 4,533,607 A | 8/1985 | Sederquist | |
| 4,567,857 A | 2/1986 | Houseman et al. | |
| 4,657,828 A | 4/1987 | Tajima | |
| 4,670,359 A | 6/1987 | Beshty et al. | |
| 4,684,581 A | 8/1987 | Struthers | |
| 4,713,234 A | 12/1987 | Weirich et al. | |
| 4,729,931 A | 3/1988 | Grimble | |
| 4,788,004 A | 11/1988 | Pinto et al. | |
| 4,838,897 A | 6/1989 | Amano et al. | |
| 4,849,187 A | 7/1989 | Uozu et al. | |
| 4,880,040 A | 11/1989 | Pierson et al. | |
| 4,981,676 A | 1/1991 | Minet et al. | |
| 5,030,661 A | 7/1991 | Lywood | |
| 5,229,102 A | 7/1993 | Minet et al. | |
| 5,326,550 A | 7/1994 | Adris et al. | |
| 5,354,547 A | 10/1994 | Rao et al. | |
| 5,382,271 A | 1/1995 | Ng et al. | |
| 5,399,323 A | 3/1995 | Paisley et al. | |
| 5,401,589 A | 3/1995 | Palmer et al. | |
| 5,409,046 A * | 4/1995 | Swenson et al. | 141/11 |
| 5,417,051 A | 5/1995 | Ankersmit et al. | |
| RE35,002 E | 7/1995 | Matsubara et al. | |
| 5,458,857 A | 10/1995 | Collins et al. | |
| 5,527,632 A | 6/1996 | Gardner | |
| 5,616,430 A | 4/1997 | Aoyama | |
| 5,637,259 A | 6/1997 | Galuszka et al. | |
| 5,639,431 A | 6/1997 | Shirasaki et al. | |
| 5,658,681 A | 8/1997 | Sato et al. | |
| 5,677,073 A | 10/1997 | Kawatsu | |
| 5,741,474 A | 4/1998 | Isomura et al. | |
| 5,741,605 A | 4/1998 | Gillett et al. | |
| 5,858,314 A | 1/1999 | Hsu et al. | |
| 5,861,137 A | 1/1999 | Edlund | |
| 5,888,273 A | 3/1999 | Buxbaum | |
| 5,897,766 A | 4/1999 | Kawatsu | |
| 5,897,970 A | 4/1999 | Isomura et al. | |
| 5,932,181 A | 8/1999 | Kim et al. | |
| 5,938,800 A * | 8/1999 | Verrill et al. | 48/127.9 |
| 5,985,474 A | 11/1999 | Chen et al. | |
| 5,997,594 A | 12/1999 | Edlund et al. | |
| 6,007,931 A | 12/1999 | Fuller et al. | |
| 6,042,956 A | 3/2000 | Lenel | |
| 6,045,772 A | 4/2000 | Szydlowski et al. | |
| 6,077,620 A | 6/2000 | Pettit | |
| 6,083,637 A | 7/2000 | Walz et al. | |
| 6,103,411 A | 8/2000 | Matsubayashi et al. | |
| 6,190,623 B1 | 2/2001 | Sanger et al. | |
| 6,221,117 B1 | 4/2001 | Edlund et al. | |
| 6,242,120 B1 | 6/2001 | Herron | |
| 6,305,442 B1 * | 10/2001 | Ovshinsky et al. | 141/231 |
| 6,375,906 B1 * | 4/2002 | Edlund et al. | 422/189 |
| 6,376,113 B1 * | 4/2002 | Edlund et al. | 429/19 |
| 6,619,333 B1 * | 9/2003 | Swanson | 141/4 |
| 6,745,799 B1 * | 6/2004 | Fuglevand | 141/9 |
| 6,792,981 B1 * | 9/2004 | Manning et al. | 141/3 |
| 2002/0116872 A1 * | 8/2002 | Edlund et al. | 48/127.9 |

FOREIGN PATENT DOCUMENTS

| | | |
|---|---|---|
| WO | WO 97/25649 | 7/1997 |
| WO | WO 99/65097 | 12/1999 |

OTHER PUBLICATIONS

Edlund, David J. and William A. Pledger, "The Practical Use of Metal-Membrane Reactors for Industrial Applications," The 1995 Membrane Technology Reviews, pp. 89-97 (Nov. 1994).

Oertel, Michael, et al., "Steam Reforming of Natural Gas with Integrated Hydrogen Separation for Hydrogen Production," Chemical Engineering Technology, vol. 10, pp. 248-255 (1987).

Piwetz et al., "Hydrodesulfurization and Prereforming of Logistic Fuels for Use in Fuel Cell Applications," presented at the 1996 Fuel Cell Seminar held Nov. 17-20, 1996 in Orlando, Florida, pp. 780-783.

English abstract of Japanese Patent No. 432150, 1992.
English abstract of Japanese Patent No. 513230, 1993.
English abstract of Japanese Patent No. 514790, 1993.
English abstract of Japanese Patent No. 604070, 1994.
English abstract of Japanese Patent No. 634540.
English abstract of Japanese Patent No. 710910, 1995.
English abstract of Japanese Patent No. 828793, 1996.
English abstract of Japanese Patent No. 6176779, 1994.
English abstract of Great Britain Patent No. 2,305,186.

Ardis, A. M., et al., "A Fluidized Bed Membrane Reactor for the Steam Reforming of Methane," The Canadian Journal of Chemical Engineering, vol. 69, pp. 1061-1070 (Oct. 1991).

Chai, M., et al., "Promotion of Methane Steam Reforming Using Ruthenium-Dispersed Microporous Alumina Membrane Reactor," Chemistry Letters, The Chemical Society of Japan, pp. 41-44 (1993).

Edlund, Dr. David and William Pledger, "Development of a Compact and Economical Steam Reformer for Fuel-Cell Systems," Fifth Grove Fuel Cell Symposium, Commonwealth Institute, London, U.K., p. 6 (Sep. 22-23, 1997).

Ledjeff-Hey, K., et al., "Compact Hydrogen Production Systems for Solid Polymer Fuel Cells," Fifth Grove Fuel Cell Symposium, Commonwealth Institute, London, U.K., p. 17 (Sep. 22-25, 1997).

Menzer, R., et al., "Fuel Processing in Fuel Cell Systems for Mobile Applications—Gasoline as Energy Carrier On-Bord," Fifth Grove Fuel Cell Symposium, Commonwealth Institute, London, U.K., (no page No.), (Sep. 22-25, 1997).

Minet, R. G., et al., "Experimental Studies of A Ceramic Membrane Reactor for the Steam/Machine Reaction at Moderate Temperatures (400-700°C)," Symposium on Natural Gas Upgrading II Presented before the Division of Petroleum Chemistry, Inc., Meeting of American Chemical Society, San Francisco, California, U.S.A., pp. 245-248 (Apr. 1992).

Teagan, W. P., et al., "Cost Reduction of Fuel Cells for Transportation Applications—Fuel Processing Options," Fifth Grove Fuel Cell Symposium, Commonwealth Institute, London, U.K. (Sep. 22-25, 1997).

* cited by examiner

VOLATILE FEEDSTOCK DELIVERY SYSTEM AND FUEL PROCESSING SYSTEM INCORPORATING THE SAME

RELATED APPLICATION

This application claims priority to co-pending U.S. Provisional Patent Application Ser. No. 60/148,521, which was filed on Aug. 12, 1999, is entitled "Steam Reforming Method and Apparatus Incorporating a Volatile Feedstock," and the complete disclosure of which is hereby incorporated by reference.

FIELD OF THE INVENTION

The invention relates generally to fuel processing systems, and more specifically to a delivery system for volatile feedstocks and fuel processing systems including the same.

BACKGROUND AND SUMMARY OF THE INVENTION

Purified hydrogen is used in the manufacture of many products including metals, edible fats and oils, and semiconductors and microelectronics. Purified hydrogen is also an important fuel source for many energy conversion devices. For example, fuel cells use purified hydrogen and an oxidant to produce an electrical potential. A process known as steam reforming produces by chemical reaction hydrogen and certain byproducts or impurities. A subsequent purification process removes the undesirable impurities to provide hydrogen sufficiently purified for application to a fuel cell.

In a steam reforming process, one reacts steam and a carbon-containing compound in the presence of a catalyst. Examples of suitable carbon-containing compounds include, but are not limited to, alcohols (such as methanol or ethanol) and hydrocarbons (such as methane, propane, gasoline or kerosene). Steam reforming requires an elevated operating temperature, e.g., between 250 degrees centigrade and 900 degrees centigrade, and produces primarily hydrogen and carbon dioxide, with lesser quantities of carbon monoxide also being formed. Trace quantities of unreacted reactants and trace quantities of byproducts also can result from steam reforming.

The invented system includes a fuel processor that produces hydrogen from a variety of feedstocks. One such fuel processor is a steam reformer, which produces purified hydrogen from a carbon-containing feedstock and water. In the invented system, various mechanisms for supplying a volatile feedstock, such as propane, under pressure to the fuel processor are disclosed. In some embodiments, the fuel processing system includes a fuel cell stack that includes at least one fuel cell adapted to produce electrical power from air (oxygen) and hydrogen gas produced by the fuel processor.

Many other features of the present invention will become manifest to those versed in the art upon making reference to the detailed description which follows and the accompanying sheets of drawings in which preferred embodiments incorporating the principles of this invention are disclosed as illustrative examples only.

DETAILED DESCRIPTION OF THE PREFERRED EMBODIMENTS AND BEST MODE OF THE INVENTION

Figure 1:
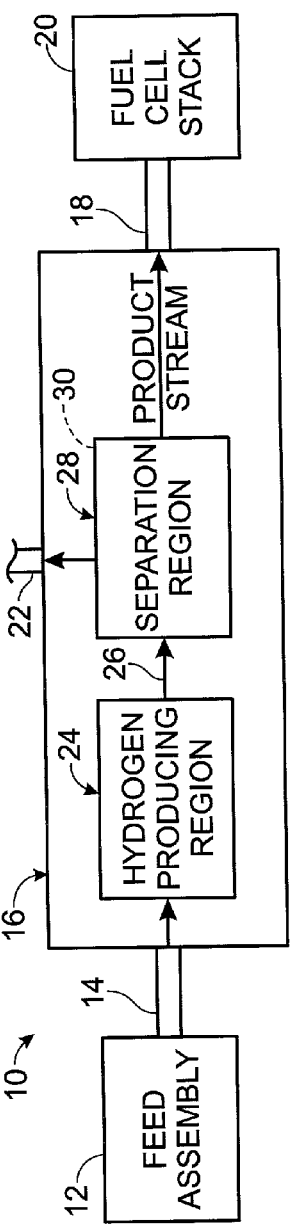
FIG. 1 is a schematic diagram of an illustrative fuel processing system.

A schematic example of a fuel processing assembly is shown in FIG. 1 and generally indicated at 10. Assembly 10 includes a feed assembly 12 that is adapted to deliver one or more feed streams 14 to a fuel processor 16. Fuel processor 16 receives the feed streams and produces a product hydrogen stream 18 therefrom. In addition to product hydrogen stream 18, fuel processor 16 generally produces one or more byproduct streams 22. These byproduct streams may be utilized for fuel, heat exchange, or feed. Alternatively, these streams may be harvested for use in other applications.

Fuel processor 16 is a device or assembly of devices adapted to produce hydrogen gas through any suitable mechanism from a single or multi-component feedstock comprising one or more feed streams. An example of a suitable mechanism for producing hydrogen gas is steam reforming, in which hydrogen gas is produced from a carbon-containing feedstock and water. Examples of suitable steam reforming units are disclosed in U.S. Pat. Nos. 5,861,137, 5,997,594 and 6,376,113, the disclosures of which are hereby incorporated by reference.

Product hydrogen stream 18 may be stored in a suitable storage device, such as a hydride bed or storage tank, or delivered for use in processes requiring purified hydrogen gas. For example, in FIG. 1, product hydrogen stream 18 is shown being delivered to a fuel cell stack 20. Fuel cell stack 20 includes at least one fuel cell, and typically includes multiple fuel cells coupled together. The fuel cell stack receives hydrogen gas from the fuel processor and produces an electric current therefrom as the hydrogen gas is reacted with oxygen to form water. The electric current produced by the fuel cell stack is then used to meet the electric load applied by one or more associated devices, such as vehicles, households, generators, boats, etc. Examples of suitable fuel cells include proton exchange membrane (PEM) fuel cells and alkaline fuel cells.

Fuel processor 16 includes a hydrogen producing region 24, in which a hydrogen containing stream, or mixed gas stream, 26 is produced from the feed streams. The hydrogen-containing stream typically contains impurities, and therefore is delivered to a separation region, or purification region, 28, where the stream is purified. In separation region 28, the hydrogen-containing stream is separated into product hydrogen stream 18 and one or more byproduct streams 22 by any suitable pressure-driven separation process. As an illustrative example, separation region 28 may include a membrane module 30, which contains one or more hydrogen permeable metal membranes, such as those discussed herein. Another example of a suitable pressure-separation process is pressure swing absorption (PSA). Therefore, region 28 may alternatively include suitable structure for performing pressure swing absorption.

Region 28 may also be referred to as a purification assembly or separation assembly. Purification assembly 28 is in communication with fuel processor 16 and adapted to receive the mixed gas stream containing hydrogen gas (and other components) from hydrogen producing region 24. Assembly 28 may be contained within fuel processor 16, such as within the housing of the fuel processor. Alternatively, region 28 may be mounted on the housing of the fuel processor. In a further variation, purification assembly 28 may be physically separated from the fuel processor, but still in fluid communication therewith, such as through the use of piping or other fluid transportation lines or mechanisms.

An example of a membrane module formed from a plurality of hydrogen-selective metal membranes is disclosed in U.S. Pat. No. 6,221,117, which was filed on Apr. 13, 1999, is entitled "Fuel Processing System," and the complete disclosure of which is hereby incorporated by reference. In that patent, a plurality of generally planar membranes are assembled together into a membrane module having flow channels through which an impure gas stream is delivered to the membranes, a purified gas stream is harvested from the membranes and a byproduct stream is removed from the membranes. Gaskets, such as flexible graphite gaskets, are used to achieve seals around the feed and permeate flow channels.

The thin, planar, hydrogen-permeable membranes are preferably composed of palladium alloys, most especially palladium with 35 wt % to 45 wt % copper. These membranes are typically formed from a thin foil that is approximately 0.001 inches thick. It is within the scope of the present invention, however, that the membranes may be formed from hydrogen-selective metals and metal alloys other than those discussed above and that the membranes may have thicknesses that are larger or smaller than discussed above. For example, the membrane may be made thinner, with commensurate increase in hydrogen flux, such as by the above-described etching process. The hydrogen-permeable membranes may be arranged in any suitable configuration, such as arranged in pairs around a common permeate channel as is disclosed in the incorporated patent applications.

Figure 2:
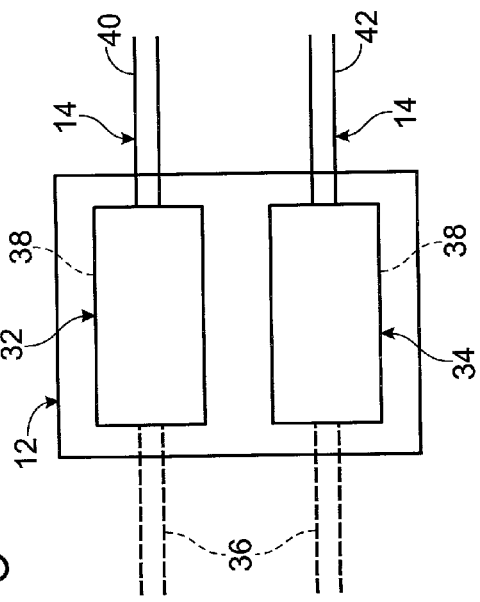
FIG. 2 is a schematic diagram of a feed assembly for the fuel processing system of FIG. 1.

In FIG. 2, an embodiment of feed assembly 12 is shown in more detail. As shown, assembly 12 includes a water delivery system 32 and a volatile feedstock delivery system 34. Each delivery system 32 and 34 includes associated pumps, transportation lines and the like to receive and deliver a stream of the appropriate feedstock to fuel processor 16. The systems may selectively receive the feedstock from an external source, such as by a fluid transportation line 36. Alternatively, or additionally, the systems may include a reservoir 38 adapted to store a selected volume of the feedstock. The reservoirs 38 may be recharged either by replacing the reservoir with a full reservoir or by refilling the reservoir by any suitable method, such as by using a fluid transportation line connected to an external source. Systems 32 and 34 deliver water and carbon-containing feed streams 40 and 42 to fuel processor 16. It should be understood that delivery system 34 may be used to deliver volatile carbon-containing feedstocks for use other than by steam reformers.

As discussed, suitable feedstocks for fuel processing assembly 16 include carbon-containing compounds such as hydrocarbons and alcohols. Some carbon-containing feedstocks are volatile. Examples of volatile hydrocarbon feedstocks include propane, butane, propylene, butylene and mixtures thereof, such as LPG.

Figure 3:
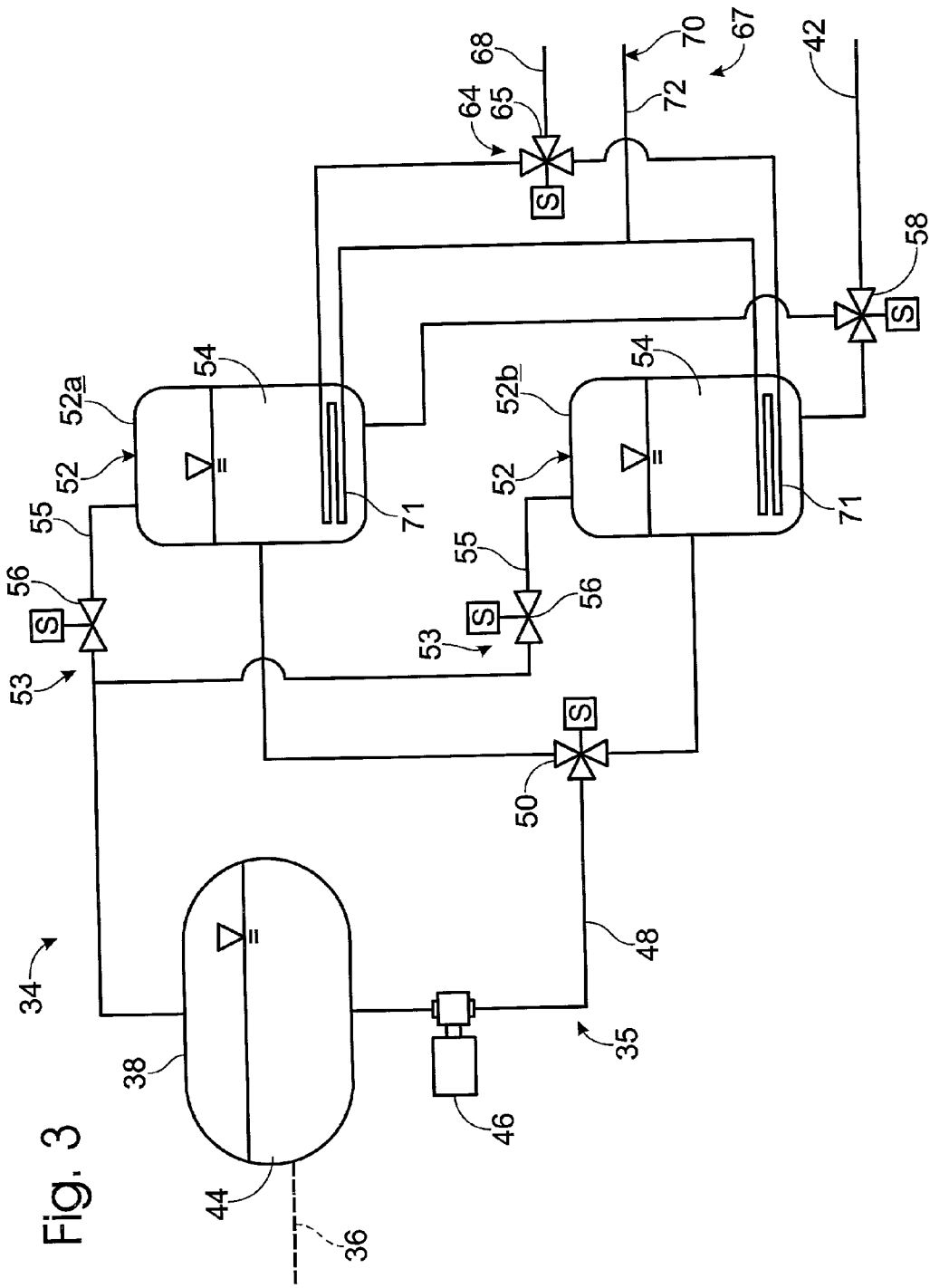
FIG. 3 is a schematic diagram of a feed assembly adapted to deliver a volatile feedstock to a fuel processor.
Figure 7:
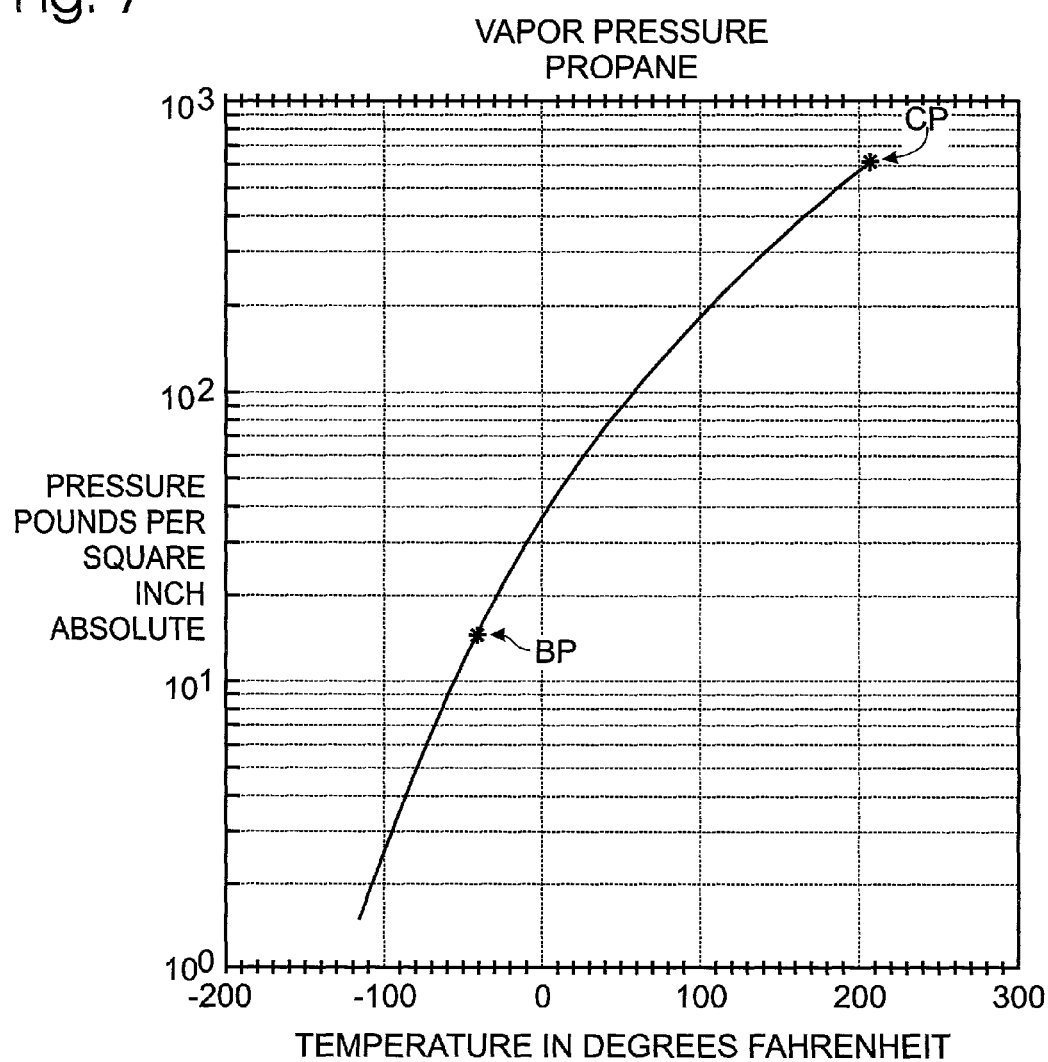
FIG. 7 is a graph showing the vapor pressure of propane as a function of temperature.

In FIG. 3, a delivery system 34 for a volatile carbon-containing feedstock is shown. System 34 is adapted to deliver stream 42 to fuel processor 16 at an elevated pressure. Steam reforming at elevated pressure is necessary to the integrated hydrogen-purification method that is based upon a hydrogen-selective membrane or other suitable pressure-driven separation process. In particular, it is preferable that steam reforming be conducted at 100 psig to 300 psig. Although propane is commonly stored as a compressed liquified gas, the vapor pressure of propane is very dependent on the temperature of the liquified gas. For instance, the vapor pressure curve of propane as a function of temperature is shown in FIG. 7. As shown, at 0° F. the vapor pressure of propane is about 29 psig, whereas at 70° F. the vapor pressure is 110 psig and at 130° F. the vapor pressure is 258 psig (Handbook of Compressed Gases, $3^{rd}$ Edition, pp. 450–451). This large variability in the vapor pressure of propane as a function of temperature presents difficulty in admitting propane into the steam-reforming region of the fuel processor at a specific elevated pressure within the range of 100 psig to 300 psig, or other pressure range at which the pressurized volatile feedstock will be used.

As shown in FIG. 3, system 34 includes a volatile feedstock supply assembly 35 that provides a source of a volatile, carbon-containing feedstock for use in delivery system 34. Supply assembly is shown including a primary reservoir 38 that is charged with a volume of a volatile carbon-containing feedstock 44, such as those described above. Reservoir 38 may be recharged through any suitable mechanism, including refill by a supply line 36 connected to an external source, by replacement with a full reservoir, and by delivery of a volume of feedstock to refill the reservoir. It is within the scope of the invention that delivery system 34 may be implemented without reservoir 38, such as when the delivery system is in communication with an external supply of feedstock.

In the subsequent discussion, system 34 will be described as a propane delivery system, however, it should be understood that the system may be used with any suitable volatile feedstock. A pump 46 draws a stream 48 of propane from primary reservoir 38 and delivers the stream in alternating fashion via feed valve assembly 50 to a plurality of heated supply reservoirs 52, each of which is adapted to store a volume of propane 54. For purposes of illustration, two supply reservoirs 52a and 52b are shown. It should be understood that additional reservoirs 52 may be used. Furthermore, a single reservoir 52 may be used, however, in such an embodiment the delivery of feedstock by system 34 will be intermittent as the reservoir is recharged and if necessary, heated. In embodiments of the delivery system where pressurized feedstock is available from an external supply, pump 46 may be omitted.

Liquid propane stored within supply reservoirs 52a and 52b is heated to raise the vapor pressure of the propane to a sufficiently high pressure to supply liquid propane directly to the fuel processor at the desired operating pressure. For instance, raising the temperature of the liquid propane within the supply reservoir to 60° C. (140° F.) will cause the propane vapor pressure to increase to 300 psig.

Propane supply reservoirs 52a and 52b are preferably optimized such that while one supply reservoir is supplying pressurized liquid propane to the fuel processor the other supply reservoir is being refilled from the master storage reservoir 38. Thus, feed valve assembly 50 properly directs propane to the supply reservoir that requires filling. Valve assembly 50 may include any suitable number and type of valve, or structure for controlling fluid flow. An example of a suitable valve assembly 50 is a three-way valve. When a particular supply reservoir 52 is filled, an exhaust vent assembly 53, such as valve 56, is opened to allow the displaced vapor from the supply reservoir to return to the master storage reservoir 38 via transportation lines 55. Preferably, valve 56 is opened only during the filling operation. In embodiments of delivery system 34 that do not include reservoir 38, the vent assembly may vent the vapor to the atmosphere or communicate with suitable transportation lines to transport the vapor to another suitable location for storage, combustion or use.

It should be understood that the time required for a reservoir to dispense its supply of feedstock may not necessarily correspond to the time required to fill the reservoir. Therefore, there may be times that one reservoir is dispensing feedstock and another reservoir is filled with preheated feedstock, which is ready to be dispensed after the currently dispensing reservoir is depleted of available feedstock.

A downstream, or delivery, valve assembly 58, such as another three-way valve, directs the flow of pressurized liquid propane from the appropriate supply reservoir 52 to the fuel processor as stream 42. Preferably, valve assemblies 50 and 58 operate in unison to ensure that one supply reservoir is being refilled while the other is providing propane stream 42 to the fuel processor. As discussed above, however, there may be times when the reservoir supplying propane (or another volatile carbon-containing feedstock) to the fuel processor still has a volume of propane to be supplied even though the other reservoir is already refilled and preheated.

As discussed, supply reservoirs 52 are maintained at elevated temperatures. The necessary heat energy required to heat the liquid propane within the supply reservoir is obtained from any suitable heat source. For example, system 34 may include a heating assembly 67 adapted to heat the reservoirs to a desired temperature. Heating assembly 67 may include a heated fluid stream 68 that heats the reservoirs through heat exchange. As shown, stream 68 passes through conduits 71 in reservoirs 52. In FIG. 3, a heating valve assembly 64, such as another three-way valve 65 is shown adapted to direct stream 68 between the two supply reservoirs so that only the reservoir that is providing propane to the fuel processor is being heated. Alternatively, the valve assembly may selectively apportion the heating fluid stream between the reservoirs, such as to maintain the dispensing reservoir at a desired delivery temperature while also providing heat to another reservoir to preheat the feedstock being supplied to the reservoir. Stream 68 may form part of a cooling fluid loop 70, in which case the stream is returned via stream 72 for reheating after heat exchange with one or more of reservoirs 52. Alternatively, the stream may be exhausted or sent to a downstream device for disposal, use, storage or the like.

An example of a suitable heating fluid stream 68 is a heated cooling fluid stream discharged from fuel cell stack 20. This stream, which typically contains water, is often obtained at 60° C. by virtue of the operating characteristics of many fuel cells. After transferring heat to the propane supply reservoir, stream 68 is returned to the fuel-cell cooling loop. Using the fuel-cell cooling fluid in this manner to heat the propane in the supply reservoir has the added benefit in that the vaporizing propane serves to remove heat from the fuel-cell cooling fluid. Preferably, the supply reservoir is not heated during the refilling operation to minimize the heat that pump 46 must work against to refill the supply reservoirs.

Figure 4:
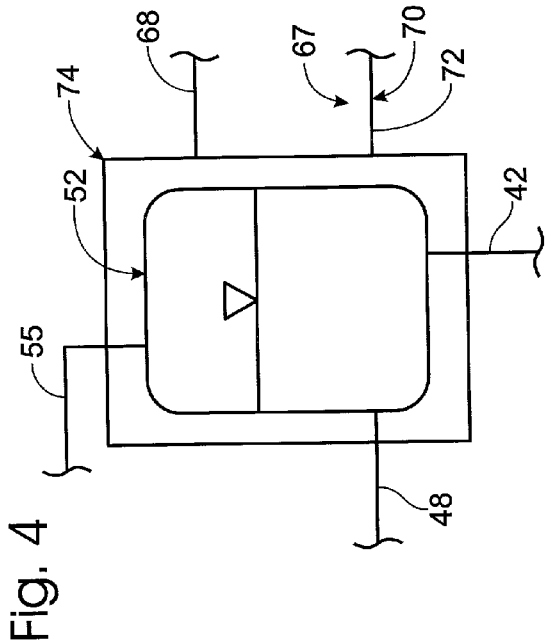
FIG. 4 is a schematic diagram of a jacketed reservoir according to the present invention.
Figure 5:
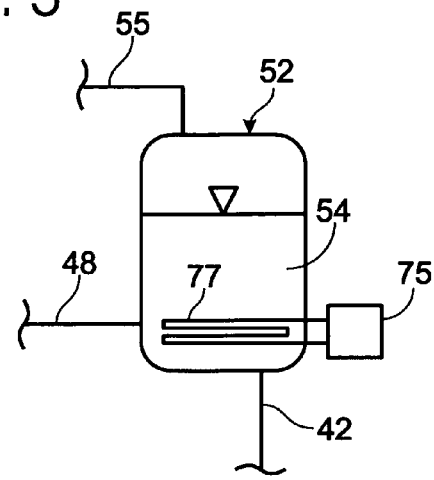
FIG. 5 is a schematic diagram of another reservoir according to the present invention.

Another suitable heating stream 68 is a heated exhaust stream from fuel processor 16. While stream 68 is shown in FIG. 3 passing through reservoirs 52, it is within the scope of the present invention that stream 68 may alternatively be delivered to a shell, or jacket, 74 that at least partially, or completely, surrounds one or more of the reservoirs, such as shown in FIG. 4. Other sources of heat can also serve to heat the propane within the supply reservoirs. For instance, electric resistance heaters, burners and the exhaust stream from a combustion chamber or combustion unit may be used. Resistance heaters may heat the exterior of the reservoirs, and/or include one or more heating rods that extend into the reservoirs. Schematically illustrated in FIG. 5 is a reservoir 52 being heating by an electric resistance heater 75 that includes one or more heating rods 77 that extend into the reservoir. The number and configuration of the rods may vary, and alternatively, the resistance heater may heat the shell of reservoir as opposed to heating the fluid within the reservoir directly.

Figure 6:
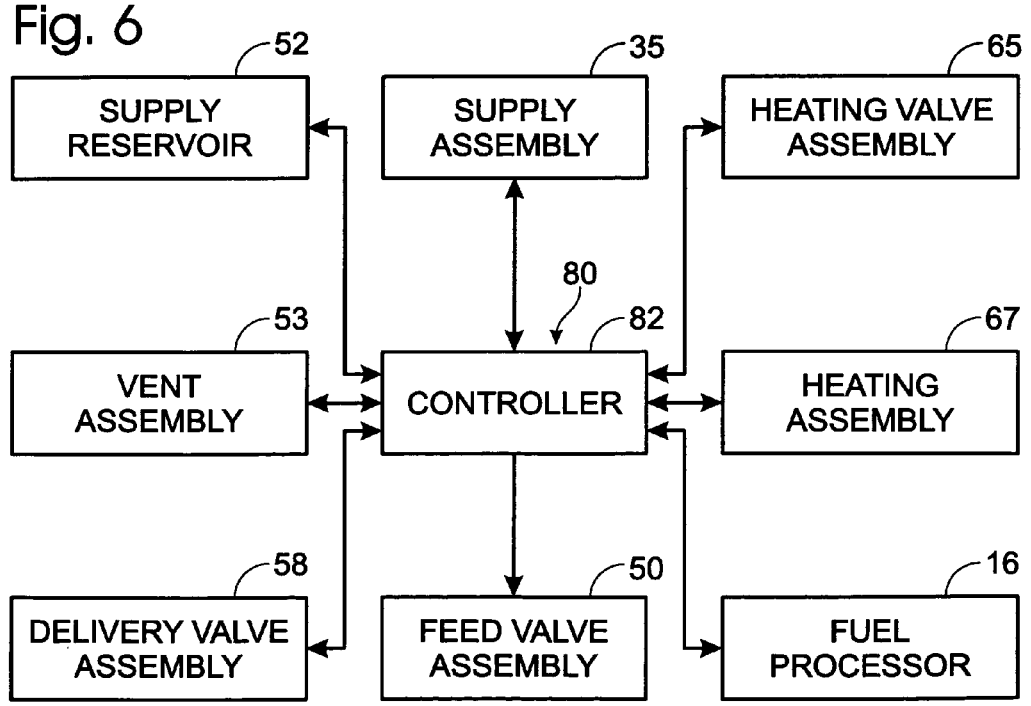
FIG. 6 is a block diagram showing a control system according to the present invention.

Delivery system 34 may further include a control system 80 adapted to control the operation of the volatile feedstock delivery system. Control system 80 includes a controller 82 that communicates with the valve assemblies, pump assemblies and suitable sensors within the delivery system. For example, control system 80 is schematically illustrated in FIG. 6, in which the communication between controller 82 and various components of fuel processing and delivery systems is shown. It should be understood that communication with all of these components is not required and that the controller may communicate with other components not shown in FIG. 6, as well as enabling communication between components via the control system.

Illustrative examples of sensors that may be used include one or more level and temperature sensors on reservoirs 52, flow meters on the fluid streams, and temperature sensors on heated fluid stream 68. It should be understood that these sensors are but illustrative examples and that a particular embodiment of the system described herein may include some or all of these sensors, as well as including one or more other sensors. Furthermore, the controller may be a separate microprocessor or other suitable device that receives measured values from the delivery system and actuates the system responsively, such as if one or more of the measured values exceed selected thresholds. Similarly, the controller may be directly associated with the sensors, which may include microprocessors adapted to direct a particular operation or operations should the measured variable or value exceed a stored or user-inputted threshold value or range of values.

Communication may be either one- or two-directional, with the controller receiving information from the communicating unit and/or directing the operation of that unit or another portion of the fuel processing system responsive to the received information. The communication described herein may be via any suitable linkage for sending and/or receiving signals between the associated elements of the system. Any suitable mechanical linkage, or wired or wireless electronic linkage may be used.

By comparing the measured values to user-inputs or stored values, the controller then selectively controls the operation of the delivery system. For example, if a measured value for a particular variable exceeds (either above or below) a threshold value or range of acceptable values, the controller may responsively actuate one or more components of the delivery system to bring the measured value, or variable, back to an acceptable value. For example, when the level of fluid in a particular reservoir falls below a selected threshold, such as indicated to controller 82 by a level sensor associated with that reservoir or a flow meter that measures the volume of fluid dispensed from that reservoir, the controller may actuate valve assembly 50 to cause feedstock supply assembly 35 to deliver more of the feedstock to that reservoir. Similarly, the controller may actuate vent assembly 53 to allow the displacement of vapor from the reservoir as the reservoir is filled. Because the reservoir that had been dispensing feedstock is now being refilled, controller 82 may actuate valve assembly 58 to cause another reservoir to begin dispensing feedstock. Controller 82 may also actuate heating assembly 67, including valve assembly 65 to allocate the supply of heating fluid between the reservoirs.

When a reservoir being filled reaches its selected full volume, as measured for example by a suitable level sensor, the controller 82 will actuate supply assembly 35 to stop the delivery of feedstock to the reservoir and vent assembly 53 to stop the displacement of exhaust vapor from the reservoir. Once the volatile carbon-containing feedstock in the reservoir reaches a selected temperature, such as indicated by a suitable thermocouple or temperature sensor, the controller may actuate heating assembly 67 to change or even stop the delivery of heat to that reservoir. Should the temperature of the feedstock in the reservoir fall below a selected minimum temperature or exceed a selected maximum temperature, controller 82 would again actuate heating assembly to bring the temperature back to an acceptable value or range of values.

INDUSTRIAL APPLICABILITY

The fuel processing system described herein is applicable in any situation where a volatile carbon-containing feedstock is to be delivered under pressure. It is particularly applicable in steam reforming applications in which hydrogen gas is produced from water and a volatile carbon-containing feedstock.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Where the claims recite "a" or "a first" element or the equivalent thereof, such claims should be understood to include incorporation of one or more such elements, neither requiring nor excluding two or more such elements.

The following claims recite certain combinations and subcombinations that are directed to one of the disclosed inventions and are believed to be novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

We claim:

1. A fuel processing system, comprising:
   a volatile carbon-containing feedstock feed assembly, and a fuel processor fluidly connected with the feed assembly, wherein the feed assembly comprises:
   a plurality of heated reservoirs to receive and store under pressure a volume of a volatile carbon-containing feedstock from a supply;
   a heating assembly to selectively heat the plurality of heated reservoirs; and
   a delivery system in fluid communication with the plurality of heated reservoirs to selectively deliver a heated output stream containing the volatile carbon-containing feedstock from a selected one of the reservoirs; and
   a fuel processor in fluid communication with the delivery system to receive the heated output stream and to produce a product stream primarily containing hydrogen gas therefrom.

2. The system of claim 1, wherein the heating assembly heats the reservoirs by heat exchange with a heated fluid stream.

3. The system of claim 2, wherein the heating assembly selectively apportions the heated fluid stream between the plurality of heated reservoirs.

4. The system of claim 3, wherein the heating assembly selectively apportions the heated fluid stream between the plurality of heated reservoirs to control the pressure of the volatile carbon-containing feedstock in the reservoirs.

5. The system of claim 1, wherein the heating assembly includes a burner that produces an exhaust stream, and further wherein the heating assembly heats the reservoirs through heat exchange with the exhaust stream from the burner.

6. The system of claim 1, wherein at least one of the reservoirs includes a shell at least partially surrounding the reservoir and spaced-apart from that reservoir to define a cavity, and further wherein the heating assembly heats at least one of the reservoirs by delivering a heated fluid stream to the cavity.

7. The system of claim 1, further including a supply assembly that selectively delivers the volatile carbon-containing feedstock to the plurality of heated reservoirs.

8. The system of claim 7, wherein the supply assembly includes a vent assembly in communication with each of the plurality of heated reservoirs, and further wherein the vent assembly selectively vents the corresponding reservoir when the supply assembly delivers the volatile carbon-containing feedstock to the reservoir.

9. The system of claim 8, wherein the vent assembly is disposed to prevent venting of each of the reservoirs except when the supply assembly is delivering the volatile carbon-containing feedstock to the reservoirs.

10. The system of claim 8, wherein the supply assembly includes a supply reservoir that stores a volume of the volatile carbon-containing feedstock for selective delivery to the plurality of heated reservoirs.

11. The system of claim 1, further including a control system that controls the pressure of the volatile carbon-containing feedstock in the reservoirs.

12. The system of claim 11, wherein the control system controls the operation of the heating assembly.

13. The system of claim 11, wherein the control system controls the reservoir from which the delivery system draws the output stream.

14. The system of claim 1, further including a separation region that increases the purity of hydrogen in the product stream via a pressure-driven separation process.

15. The system of claim 14, wherein the fuel processor receives water and produces the product stream from the water and the output stream via a steam reforming reaction.

16. The system of claim 14, further including a fuel cell stack that receives the product stream and which includes at least one fuel cell that produces electrical power therefrom.

17. The system of claim 1, wherein the delivery system delivers the output stream at a selected pressure.

18. The system of claim 17, wherein the selected pressure is approximately 100–300 psig.

19. The system of claim 17, wherein the selected pressure includes a range of pressures.

20. The system of claim 1, wherein the heated output stream is a liquid heated output stream when drawn from the selected one of the reservoirs.

21. A fuel processing system, comprising:
a fuel processor that produces a product gas stream primarily containing hydrogen gas from a feedstock;
a feed assembly that delivers the feedstock at a selected pressure to the fuel processor, wherein the feed assembly includes a volatile feedstock feed system, comprising:
a plurality of reservoirs that receive and store under pressure a volume of a volatile carbon-containing feedstock from a supply;
a delivery system that draws a feed stream from a selected one of the reservoirs as a heated liquid stream, wherein the delivery system includes a delivery valve assembly that selectively delivers to the fuel processor the feed stream containing volatile carbon-containing feedstock from the selected one of the reservoirs at a pressure at least as great as the selected pressure;
a supply system including a supply valve assembly that selectively fills the reservoirs with the volatile carbon-containing feedstock; and
a heating assembly adapted that selectively heats the plurality of reservoirs to maintain the pressure of the volatile carbon-containing feedstock in the reservoirs at or above the selected pressure.

22. The system of claim 21, wherein the supply and delivery valve assemblies selectively deliver volatile carbon-containing feedstock from one of the reservoirs while supplying volatile carbon-containing feedstock to another one of the reservoirs.

23. The system of claim 21, further including a fuel cell stack that receives the product stream and which includes at least one fuel cell that produces electrical power therefrom.

24. The system of claim 21, further including a control system which controls the pressure of the volatile carbon-containing feedstock in the feed stream.

25. The system of claim 24, wherein the control system controls the operation of the heating assembly to control the temperature of the reservoirs.

26. The system of claim 24, wherein the control system controls the operation of the supply system to control the volume of the volatile carbon-containing feedstock in the reservoirs.

27. The system of claim 24, wherein the control system controls the operation of the delivery system to control the delivery of the feed stream.

28. The system of claim 24, wherein the control system includes a controller in communication with a sensor assembly.

29. The system of claim 28, wherein the sensor assembly includes temperature sensors that measure the temperature in the reservoirs.

30. The system of claim 28, wherein the sensor assembly includes level sensors that measure the volume of the volatile carbon-containing feedstock in the reservoirs.

31. The system of claim 28, wherein the sensor assembly includes pressure sensors that measure the pressure of the volatile carbon-containing feedstock in the reservoirs.

32. The system of claim 21, wherein the selected pressure is approximately 100–300 psig.

33. The system of claim 21, wherein the selected pressure includes a range of pressures.

* * * * *

UNITED STATES PATENT AND TRADEMARK OFFICE
CERTIFICATE OF CORRECTION

| | | |
|---|---|---|
| PATENT NO. | : 7,135,048 B1 | Page 1 of 1 |
| APPLICATION NO. | : 09/636814 | |
| DATED | : November 14, 2006 | |
| INVENTOR(S) | : David J. Edlund and Thomas G. Herron | |

It is certified that error appears in the above-identified patent and that said Letters Patent is hereby corrected as shown below:

Column 9,
Line 37, after "a heating assembly" delete "adapted"

Signed and Sealed this

Third Day of April, 2007

JON W. DUDAS
*Director of the United States Patent and Trademark Office*